July 8, 1969   J. D. WILSON   3,454,848

ELECTRICAL CAPACITOR

Filed June 7, 1968

60 ∿ DISSIPATION FACTOR % VS TEMPERATURE

DISSIPATION FACTOR % VS FREQUENCY

• — 30°C
× — 120°C

FREQUENCY (KC)

INVENTOR
JERRY D. WILSON

*James J. Lichiello*
ATTORNEY

United States Patent Office 3,454,848
Patented July 8, 1969

3,454,848
ELECTRICAL CAPACITOR
Jerry D. Wilson, The Plains, Ohio, assignor to General
Electric Company, a corporation of New York
Filed June 7, 1968, Ser. No. 735,189
Int. Cl. H01g 1/00
U.S. Cl. 317—258     10 Claims

ABSTRACT OF THE DISCLOSURE

An electrical capacitor incorporates a resinous dielectric material which is a polyblend of a polyphenylene oxide and polyethylene. A particularly favorable dielectric composition comprises a major proportion of poly(2,6-dimethylphenylene-1,4)oxide and a minor proportion of polyethylene.

Background of the invention

*Field of the invention.*—The present invention relates to electrical capacitors and more particularly to electrical capacitors incorporating a resinous dielectric material which confers improved electrical properties thereon, especially under conditions of elevated temperature.

*Description of the prior art*

As is well known in the art, dielectric materials of low dissipation factor are desirable for use in capacitors to avoid energy loss and excessive heat generation which would otherwise cause undue shortening of the life of the capacitor. While various types of otherwise desirable dielectric materials are known which may have satisfactory dissipation factors in capacitors operative at normal operating temperatures, such dielectric materials generally do not retain their low dissipation factors in capacitors under conditions of elevated temperature, for example, 100° C. and above. Further, many of these known synthetic resin capacitor dielectric materials generally do not have a sufficiently high softening point to enable them to be used at elevated temperatures, to which electrical capacitors may be subjected under operating conditions. As a result, these known dielectric resin materials have generally exhibited thermally unstable electrical properties, particularly capacitance and dissipation factors. This instability can lead to premature failure of capacitors.

Summary of the invention

It is, therefore, an object of this invention to provide an improved synthetic resin dielectric capacitor having good electrical properties and being capable of operating at elevated temperatures without significant degradation to these properties.

It is an object of the invention to provide capacitors having a dielectric material incorporated therein which confers improved electrical and thermal properties on the capacitors.

It is another object of the invention to provide dielectric material for capacitors and other electrical apparatus which is characterized by superior insulation resistance and thermal stability.

It is still another object of the invention to provide a dielectric material for capacitors and other electrical apparatus which is characterized by low dissipation factor as a function of frequency.

It is a yet further object of the invention to provide a dielectric material for capacitors and other electrical apparatus which is characterized by low dissipation factor as a function of temperature.

It is a still further object of the invention to provide a polyphenylene oxide-polyethylene polymer blend dielectric material for capacitors and other electrical apparatus.

Other objects and advantages will become apparent from the following description and appended claims.

It is desirable in electrical apparatus such as capacitors and other apparatus wherein the dielectric constant of the dielectric material affects the operation of the apparatus, that the dielectric constant of the dielectric material be substantially constant over the predetermined range of operation of the apparatus. However, the dielectric constant is varied by changes in the ambient temperature to which the apparatus is subjected or by changes in the frequency of electrical voltage or current to which the apparatus is subjected.

It has been found that a particularly advantageous capacitor having a low dissipation factor and exhibiting markedly stable electrical properties, e.g., capacitance, at elevated temperatures can be obtained by the use of a dielectric material comprising a polyblend of a polyphenylene oxide and polyethylene. Ordinarily, polyphenylene oxide films are extremely brittle, difficult to fabricate and quite costly. However, a polyblend possesses, in large part, the exceptional electrical characteristics of the polyphenylene oxide component, and the beneficial mechanical properties imparted by the polyethylene component. Further, it has been found that the desirable electrical characteristics of the polyblend are increased over those which might be predictable based upon the proportional amount of polyphenylene oxide present and its electrical characteristics.

In its broadest form, the present invention relates to an electrical capacitor comprising a pair of electrodes separated by dielectric material comprising a polyblend of polyphenylene oxide, such as poly(2,6-dimethylphenylene - 1,4)oxide, and a polyethylene in which the first component is present in major proportions, i.e., 50% or more of the blend material and the polyethylene, together with remaining constituents, if any, constituting less than 50% of the blend material.

Briefly, in accordance with the present invention, it has been found that an excellent dielectric material is produced by mixing a major proportion of a polyphenylene oxide, up to 97%, with a minor proportion of polyethylene. This dielectric material, when used as the dielectric material of an electrical capacitor, provides an electrical capacitor having a very low dissipation factor in the range from room temperature to 180° C. and a very low dissipation or power factor when subjected to frequencies of from 60 c.p.s. to 100 kc. This dielectric material also displays a substantially constant dielectric constant as a function of temperature.

The invention will be better understood from the following description taken in conjunction with the accompanying drawing, in which.

Figure 1:
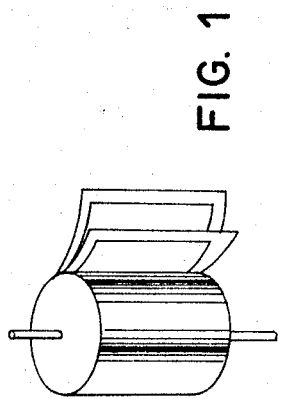
FIGURE 1 is a perspective view of a partially unrolled capacitor assembly of a type in which the present invention may be suitably embodied.

Referring now to the drawing and particularly to FIGURE 1, there is shown a roll type capacitor comprising a pair of convolutely wound electrode foils 1 and 2 of suitable metals, such as aluminum, insulated from each other by one or more separate films 3 and 4 of dielectric material herein described. Terminal leads 5 and 6 are electrically connected to respective foil electrodes 1 and 2 and project from either end or from opposite ends of the wound capacitor section.

It will be obvious that various other forms of capacitors employing the dielectric material herein described are within the scope of this invention. Thus, in another form of wound capacitor, a pair of convolutely wound dielectric films or other supporting strips having metallized coatings thereon may serve as the capacitor electrodes. The metallized electrode coatings may be composed of aluminum or any other suitable conducting material such as tin, silver, copper, lead, zinc, or nonmetallic solid conductive material such as carbon, and may be applied by metallizing or other suitable metal depositing techniques. A satisfactory metal coating may be produced, for example, by vacuum evaporation of the desired metal, or sputtering, dripping, pinking, chemical deposition, or the like.

In still another embodiment, a wound capacitor section such as the wound section shown in FIGURE 1 is enclosed in a casing, usually metal, containing a dielectric liquid which is compatible with the synthetic resin polyblend dielectric composition of the present invention. Suitable dielectric liquids include chlorinated hydrocarbons and chlorodiphenyls such as trichorodiphenyl. Other liquid impregnants includes silicone oil, ester fluids, cottonseed oil, and the like. The chlorinated hydrocarbon impregnated embodiment of this invention may include the concepts in U.S. Patents 3,363,156, Cox; or 2,864,982, Ruscetta, assigned to the same assignee as the present invention.

While the synthetic resin sheet dielectric material shown in FIGURE 1 is used as the sole dielectric material, the synthetic resin sheet may be used in conjunction with sheets of other materials such as kraft paper and other types of dielectric sheets to provide a complex laminate or sandwich type of dielectric spacer system, particularly, but not exclusively, where the auxiliary spacer material is porous or absorbent and used as wicking, for example, for the purpose of enabling improved distribution of impregnating liquids in capacitors. The polyblend dielectric material may be used with additives or fillers such as finely divided aluminum oxide or silica flour. If desired, the dielectric spacer material between capacitor electrodes may be in the form of paper or other porous or obsorbent insulating sheets such as glass cloth, asbestos, or textile cloth which have been impregnated and/or coated with the described resin dielectric composition.

The capacitors incorporating the described resin composition may also be employed in dry form or impregnated with hardenable liquid dielectric materials of well known types which are cured to provide a final capacitor unit with composite solid dielectric.

The described dielectric films may have conducting layers deposited thereon by known metallizing processes to provide electrodes on their surface, either when in the form of self-supporting films or in the form of coatings on a metal base.

The dielectric spacer material separating the capacitor electrodes is composed of a polyblend of a polyphenylene oxide material and a polyethylene material, preferably a high density polyethylene. The proportion of each of the components of the polyblend is dependent upon the results desired.

The polyphenylene oxide employed in this invention has a repeating structural unit of the formula

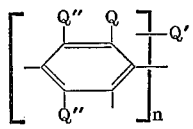

wherein the oxygen atom of one unit is connected to the benzene nucleus of the adjoining unit, $n$ is a positive integer and is at least 100, Q is a monovalent substituent selected from the group consisting of hydrogen, hydrocarbon radicals free of a tertiary α-carbon atom, halohydrocarbon radicals having at least two carbon atoms between the halogen atom and the phenol nucleus and being of a tertiary α-carbon atom, hydrocarboxy radicals being free of a tertiary α-carbon atom, and halohydrocarbonoxy radicals having at least two carbon atoms between the halogen atom and phenol nucleus and being free of the tertiary α-carbon atom, Q' and Q" are both monovalent substituents which are the same as Q and, in addition, halogen.

The polyphenylene oxides used in practicing the present invention and the methods of making the same are more fully disclosed in U.S. Patents 3,306,874, Hay; and 3,306,875, Hay, and preferably in Patent 3,292,061, Eustance, and in copending application Ser. No. 593,733, filed Nov. 14, 1966, each assigned to the same assignee as the present invention.

For the purposes of the present invention, the higher molecular weight polyphenylene oxide products where the molucular weight is at least about 10,000 are preferred. The maximum molecular weight is limited only by the ability to fabricate and form the polymer material for the desired purposes.

The polyethylene materials suitable in preparing the dielectric material are capacitor grade polyethylene, preferably of high density.

The particular method of blending, or more specifically, dispersing the polyethylene in the polyphenylene oxide is not critical. The only requirement for the dispersing operation is that the polyethylene be as homogeneously dispersed through the polyphenylene oxide as possible. It is believed that with incomplete or nonhomogeneous dispersions, aggregates tend to form and impair the physical properties of the polyblend.

The dispersing operation may be carried out by an means known to those skilled in the art. For example, the dispersing operation may be carried out by mixing the two polymers in granular or powdered form in a Banbury mixer and/or roll mills or mixing may be carried out continuously by means of extrusion of a mixture of polymers. Another convenient method for forming the dispersion consists of dissolving the two polymers in a solvent in which they are mutually soluble and co-precipitating the polymers as a homogenous mixture.

Extrusion has been found to be a preferred manner of blending the components as this method was found to give the greatest degree of dispersion or homogeneity. However, coprecipitation of the two polymers from a common solvent is also a satisfactory method.

In general, when forming the mixture by extrusion, the two polymers, in granular or powder form, were first mixed by tumbling with finer powders, providing the greater degree of homogeneity. The mixture was then fed to the hopper of an extrusion press and extruded at a temperature within the range of 450° F. to 650° F. In order to insure complete dispersion of the polyethylene in the polyphenylene oxide, it may be desirable to pelletize the extruded strand in a chopper and reextrude under the same extrusion conditions.

In a preferred embodiment of this invention, a plasticizer is incorporated with the blend of polyethylene and polyphenylene oxide. The use of a plasticizer causes a dissolving or swelling of both polymeric components and thereby enhances mixing by reducing the friction between polymer particles. This prevents preferential association of regions of the same polymer. Generally speaking, any plasticizer which is compatible with both polyethylene and polyphenylene oxide may be used. Typical examples of the plasticizers suitable are compounds such as the chlorinated biphenols, mineral oil, etc. The amount of plasticizer employed should be kept at a level which will not unduly diminish properties of the blend, i.e., rigidity, heat distortion, etc., as well as electrical characteristics.

The amount of polyethylene which may be incorporated with polyphenylene oxide is that amount which is compatible with the polyphenylene oxide and does not segregate out into a separate area. In general, up to approximately ten percent (10%) by weight polyethylene can be incorporated with polyphenylene oxide before some incompatibility is noticed. These blends are more fully described in 3,361,851, Gowan, assigned to the same assignee as the present invention. Particularly good capacitor results were obtained with inclusions of between three percent (3%) to five percent (5%) by weight polyethylene. Accordingly, in a preferred embodiment of this invention, I include between 3% and 5% polyethylene with polyphenylene oxide in preparing the dielectric materials.

Polyphenylene oxide-polyethylene polyblends used as dielectric material for capacitors in accordance with the invention may be extruded, rolled, pressed or cast from solution to form thin films. They may also be applied as dielectric coatings to the surfaces of electrode foils from solution or suspension, or by fluidized bed coating methods well known in the art. Thus, resin coated electrode foils may be provided wherein the dielectric resin coating is applied to the surfaces of each foil with exposed metal margins at opposite sides of the wound roll, as shown, for example, in U.S. Patent 2,995,688, Rosenberg, assigned to the same assignee as the present invention.

In order to improve the mechanical properties or resinous films, in addition to improving electrical capacitor and impregnation characteristics, it is common to impart some form of ordered structure to such films by stretching them. Preferably this stretching is done in perpendicular directions, i.e., both longitudinally and transversely of the film length, so as to impart a biaxial orientation to the film.

Samples of film of the present invention were prepared by various techniques and the prepared films were metallized to permit measurement of their electrical properties. For example, dielectric films were prepared by placing a mixture of polyethylene and polyphenylene oxide in the desired proportions in a Carver press, heating between aluminum foils and pressing at a pressure of from about 2,000 pounds per square inch (p.s.i.) to 20,000 p.s.i.

Films were also prepared by extrusion from pellets and by solvent casting. Solvent cast films were prepared by dissolving polyethylene and polyphenylene oxide in chloroform (USP grade) and casting on a glass plate. The film was stripped from the plate after the solvent evaporated.

Dielectric film samples of the polyblend, regardless of the technique employed in their formation, were then metallized with gold in a circle of from 1-inch to 3-inch diameter by vapor deposition. The samples were placed in a test cell and heated to from about 65–140° C., depending on sample composition, at 40–100 microns pressure, for about 16 hours. They were then allowed to stabilize at this temperature for thirty minutes in a dry nitrogen atmosphere. While remaining in this dry nitrogen atmosphere, heating of the samples was terminated and the samples were allowed to slowly cool to room temperature.

In a specific example, samples consisting of 95 percent, by weight, poly(2,6-dimethylphenylene-1,4)oxide and 5%, by weight, of a capacitor grade high density polyethylene, were metallized with gold by vapor deposition. These samples were placed in a test cell and heated at 120° C. under 100 microns pressure for sixteen hours. The cell was then broken to dry nitrogen and allowed to stabilize thermally. Heating was discontinued and measurements were taken during cooling to room temperature. The samples were placed in a forced air oven for measurement at higher temperatures.

Figure 2:
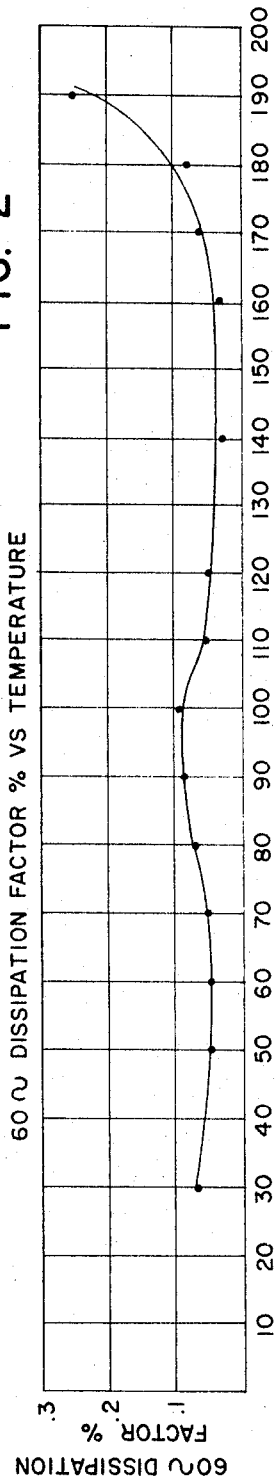
FIGURE 2 is a graphic illustration of the dissipation factor in percent versus temperature at 60 c.p.s.
Figure 3:
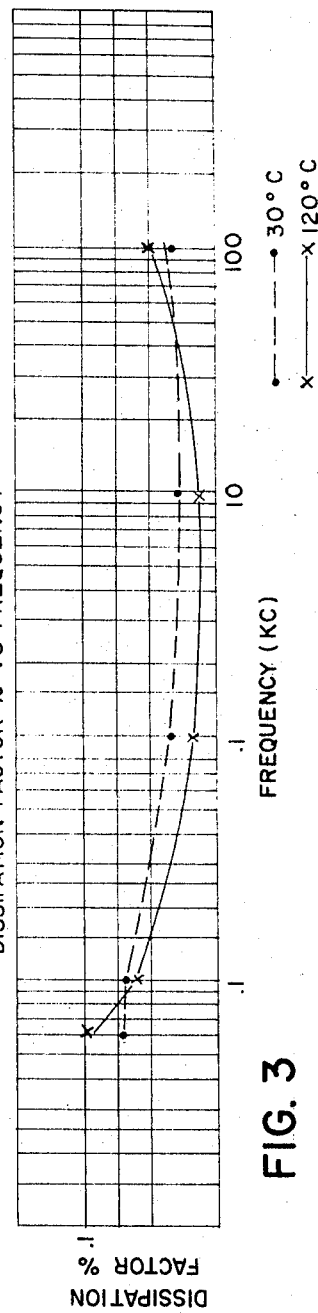
FIGURE 3 is a graphic illustration of the dissipation factor in percent versus frequency.

Referring to FIGURE 2, it will be seen that the dissipation factor versus temperature was less than .1% from room temperature to 180° C. A slight increase in dissipation factor was noted in the 90–110° C. range. Referring to FIGURE 3, it will be seen that as a function of frequency, the dissipation factor was less than .1% from 60 c.p.s. to 100 kc. It was further noted that capacitance was relatively constant as a function of temperature and frequency.

In another example, employing dielectric material containing 3% polyethylene, less than one percent $TiO_2$, and the balance poly(2,6-dimethylphenylene-1,4)oxide, 0.005 inch thick samples were metallized with 2 inch diameter gold electrodes and treated as described above. Test results were comparable to those enumerated for the samples containing 95% of the polyphenylene oxide.

Not only do the electrical capacitors of the present invention exhibit unexpected thermal stability of capacitance, but they also display a consistently low and stable dissipation factor with changes in temperature. Moreover, it has been found that by selection of the proper proportions of polyethylene and polyphenylene oxide, a desirable balance can be struck between workability, cost and electrical properties. These advantages are most apparent in blends up to 10% of polyethylene in the polyphenylene oxide.

While the present invention has been described with reference to a specific polyphenylene oxide, it will be obvious that any of the materials described in the aforementioned patents may be employed, and it will be understood that numerous modifications may be made by those skilled in the art without actually departing from the scope of the invention. Therefore, the appended claims are intended to cover all such equivalent variations as come within the true spirit and scope of the invention.

What is claimed as new and desired to be secured by Letters Patent of the United States is:

1. A capacitor comprising a pair of electrodes and a dielectric spacer therebetween, said dielectric spacer comprising a polyblend of polyphenylene oxide and polyethylene oxide and polyethylene.

2. A capacitor as claimed in claim 1 wherein said blend is biaxially oriented.

3. A capacitor, as claimed in claim 1, wherein said polyphenylene oxide component comprises the major proportion of said polyblend.

4. A capacitor as claimed in claim 1 wherein said polyphenylene oxide comprises at least 90% by weight of said polyblend.

5. A capacitor as claimed in claim 1 wherein said polyethylene comprises at least 10% by weight of said polyblend.

6. A capacitor as claimed in claim 1 wherein said polyphenylene oxide is poly(2,6-dimethylphenylene-1,4)-oxide.

7. A capacitor as claimed in claim 6 wherein said polyphenylene oxide comprises, by weight, 95% of said polyblend and wherein said polyethylene comprises, by weight, 5% of said polyblend.

8. A capacitor as claimed in claim 6 wherein said polyphenylene oxide comprises by weights, 97% of said polyblend and wherein said polyethylene comprises, by weight, 3% of said polyblend.

9. The invention as recited in claim 1 wherein said polyblend is a biaxially oriented polyblend comprising at least about 90% by weight poly(2,6-dimethylphenylene-1,4)oxide.

10. The invention as recited in claim 9 wherein said polyblend material is impregnated with a chlorinated hydrocarbon.

References Cited

UNITED STATES PATENTS 3,292,061   12/1966   Eustance _____ 317—258

E. A. GOLDBERG, *Primary Examiner.*

U.S. Cl. X.R.

252—63.2

UNITED STATES PATENT OFFICE

CERTIFICATE OF CORRECTION

Patent No. 3,454,848  Dated July 8, 1969

Inventor(s) Jerry D. Wilson

It is certified that error appears in the above-identified patent and that said Letters Patent are hereby corrected as shown below:

Column 6, line 35, delete "and polyethyl-";
line 36, delete "ene oxide".

SIGNED AND SEALED

DEC 9 - 1969

(SEAL)
Attest:

Edward M. Fletcher, Jr.
Attesting Officer

WILLIAM E. SCHUYLER, JR.
Commissioner of Patents